United States Patent
Noguchi (10) Patent No.: US 8,612,717 B2
(45) Date of Patent: Dec. 17, 2013

(54) STORAGE SYSTEM

(75) Inventor: Yoshiaki Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 170 days.

(21) Appl. No.: 13/202,290

(22) PCT Filed: Aug. 20, 2009

(86) PCT No.: PCT/JP2009/003965
§ 371 (c)(1),
(2), (4) Date: Aug. 18, 2011

(87) PCT Pub. No.: WO2010/097848
PCT Pub. Date: Sep. 2, 2010

(65) Prior Publication Data
US 2011/0302213 A1 Dec. 8, 2011

(30) Foreign Application Priority Data
Feb. 27, 2009 (JP) ................................. 2009-045232

(51) Int. Cl.
*G06F 12/00* (2006.01)
(52) U.S. Cl.
USPC ................... 711/200; 711/E12.001; 707/797; 707/E17.012
(58) Field of Classification Search
USPC ............ 711/200, E12.001; 707/797, E17.012
See application file for complete search history.

(56) References Cited

U.S. PATENT DOCUMENTS

2004/0061724 A1 4/2004 Sato
2006/0101196 A1 5/2006 Urmston et al.

FOREIGN PATENT DOCUMENTS

| CN | 1159031 A | 9/1997 |
| CN | 1685353 A | 10/2005 |
| JP | 2005-235171 A | 9/2005 |
| JP | 2008-519362 A | 6/2008 |

OTHER PUBLICATIONS

Office Action issued by Chinese Patent Office in corresponding Chinese Patent Application No. 200980157264.5, dated Aug. 16, 2013.

*Primary Examiner* — Yong Choe
(74) *Attorney, Agent, or Firm* — Sughrue Mion, PLLC (57) ABSTRACT

A storage system includes: a data storing means configured to store storage target data and also store address data so as to be tree-structured, the address data being based on a content and storing position of data to be referred to, and the address data referring to the storage target data or other address data; an operation log generating means configured to generate an operation log that represents a content of an operation of storing the storage target data into the data storing means and a content of an operation of storing the tree-structured address data referring to the storage target data into the data storing means; and a file system committing means configured to store the storage target data and the tree-structured address data into the data storing means based on the operation log.

11 Claims, 9 Drawing Sheets

STORAGE SYSTEM

CROSS REFERENCE TO RELATED APPLICATIONS

This application is a National Stage of International Application No. PCT/JP2009/003965 filed Aug. 20, 2009, claiming priority based on Japanese Patent Application No. 2009-45232 filed Feb. 27, 2009, the contents of all of which are incorporated herein by reference in their entirety.

TECHNICAL FIELD

The present invention relates to a storage system, and specifically, relates to a storage system of a content address type that, by a unique address specified depending on the content of stored data, specifies a storing position in which the data is stored.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be retrieved later with ease. As a result, such a storage system is desired that is capable of automatically realizing increase of the storage capacity and performance thereof, that eliminates a duplicate of storage to reduce the cost for storage, and that has high redundancy.

Under such circumstances, in recent years, a content address storage system has been developed as shown in Patent Document 1. This content address storage system distributes and stores data into a plurality of storage devices, and specifies a storing position in which the data is stored based on a unique content address specified depending on the content of the data. To be specific, the content address storage system divides predetermined data into a plurality of fragments, adds a fragment as redundant data thereto, and stores these fragments into a plurality of storage devices, respectively.

Later, by designating content addresses, it is possible to retrieve data, that is, fragments stored in storing positions specified by the content addresses and restore the predetermined data before being divided from these fragments.

Further, the content address is generated so as to be unique depending on the content of data. For example, a hash value of data is used. Therefore, in the case of duplicated data, it is possible to acquire data having the same content with reference to data in the same storing position. Accordingly, it is not necessary to separately store duplicated data, and it is possible to eliminate duplicated recording and reduce the data capacity.

Further, in the content address storage system, a tree-type file system is used. In this system, a content address referring to stored data is referred to by a content address positioned in a higher hierarchy, whereby content addresses are stored so as to be tree-structured. Thus, by following reference destinations of a content address from a higher hierarchy to a lower hierarchy, it is possible to access target stored data.

Figure 1:
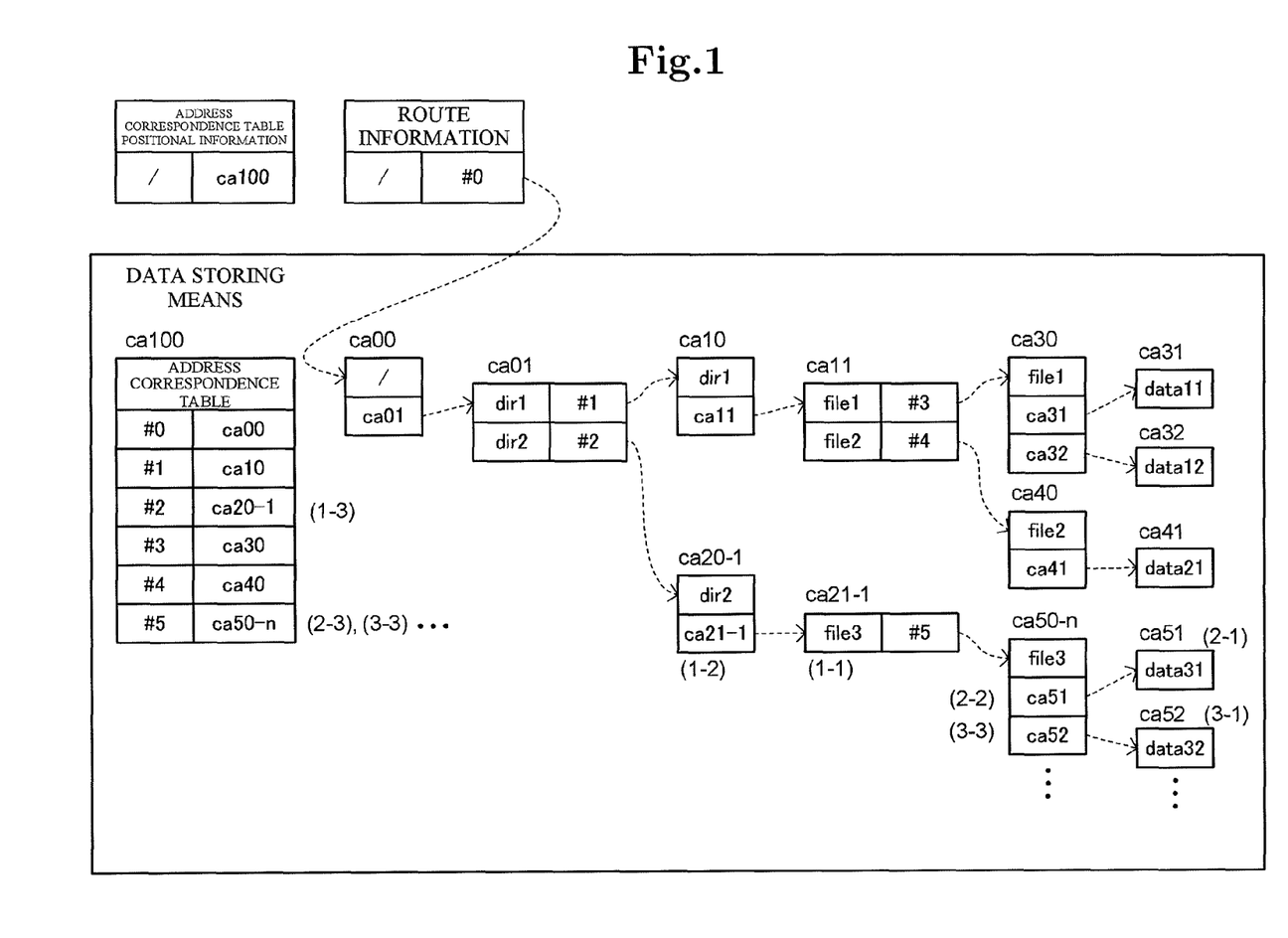
FIG. 1 is a view showing an aspect of data storing in a storage system relating to the present invention.

With reference to FIG. 1, an aspect of data storing in the content address storage system will be described. To be specific, a change of a tree structure (a hierarchical structure) of content addresses referring to stored data after the data is stored will be described.

FIG. 1 shows data stored in a data storing means of the content address storage system. Boxes denoted by "ca00" and "ca01" are data blocks, and "ca00" and "ca01" are content addresses representing storing positions specified depending on the content of data.

As a method that a certain data block refers to another data block, there is a method of using a direct address beginning with "ca" and a method of using an indirect address like "#1." An address correspondence table "ca100" stores content addresses as reference destinations of indirect addresses. For example, a storing destination of "file 1" is "#3," and an indirect address is used without recording a direct content address "ca30." This is because, when a direct address is used, a change in a leaf that is the end of the tree structure is propagated to a root. For example, a change of "ca30" changes "ca11," and moreover, changes "ca10" in a higher hierarchy. However, when an indirect address is used, a content address corresponding to the indirect address can be changed in the address correspondence table, and it is possible to inhibit propagation of the change of the address as described above. A source for following the tree structure is stored as route information, and it is possible to follow lower hierarchies in the tree structure from the route information to stored data.

Next, an operation of storing the tree structure into the content address storage system will be shown, and a problem thereof will be described. In the initial state, a root directory "/" has directories "/dir1" and "/dir2" thereunder. An operation of creating a directory "/dir2/file3" when the directory "/dir1" has directories "/dir1/file1" and "/dir1/file2" thereunder will be described.

Firstly, for creating the directory "/dir2/file3", a file is "opened" and an entry for "file3" is created in "dir2." Then, "file3=#5" as the entry for "file3" is stored into the data storing means and an address "ca21-1" is obtained (1-1). Then, this address "ca21-1" is stored as an address referred to by "dir2" (1-2), and an address "ca20-1" referring to a data block "dir2, ca21-1" is obtained. After that, the address is associated with "#2" as an indirect reference address of "dir2," and registered into the address correspondence table (1-3). Thus, a tree structure of the address data is committed.

Subsequently, it is assumed that a data block "data31" is stored into the data storing means (2-1). Then, an address of "ca51" of the data block is obtained, and the content address is recorded into a data block list "ca50(ca50-n)" of "file3" (2-2). Consequently, an address "ca50-1" of the data block list is obtained and associated with an indirect reference address "#5" of "file3," and "#5=ca50-1" is recorded in the address correspondence table (2-3). Thus, the state of "file3" is committed.

Subsequently, it is assumed that a data block "data32" is further stored into the data storing means will be described (3-1). Then, a content address "ca52" of the data block is obtained and recorded into the data block list "ca50(ca50-n)" of "file3" (3-2). Consequently, the address of the data block list is changed to "ca50-2" and is associated with the indirect reference address "#5" of "file#," and "#5=ca50-2" is recorded into the address correspondence table (3-3).

[Patent Document 1] Japanese Unexamined Patent Application Publication No. JP-A 2005-235171

However, in the content address storage system described above, the tree structure changes not only at the time of creation of a directory or a file but also at the time of writing of a file, and the amount thereof may be proportion to a file size. Then, an intermediate state of a content address, which does not need to be stored essentially, is stored into the data storing means. Therefore, a storing region of the content address storage system that does not delete data in preparation for storing of the same data in the future is wastefully used. Moreover, in the content address storage system that takes a longer time than a general file system for obtaining a hash value from data, there is a problem that a writing time delays.

SUMMARY

Accordingly, an object of the present invention is to reduce a storage capacity and shorten a storage processing time as the abovementioned task, and provide a high-performance storage system.

In order to achieve the object, a storage system of an embodiment of the present invention includes:

a data storing means configured to store storage target data and also store address data so as to be tree-structured, the address data being based on a content and storing position of data to be referred to, and the address data referring to the storage target data or other address data;

an operation log generating means configured to generate an operation log that represents a content of an operation of storing the storage target data into the data storing means and a content of an operation of storing the tree-structured address data referring to the storage target data into the data storing means; and a file system committing means configured to store the storage target data and the tree-structured address data into the data storing means based on the operation log.

Further, a program of another exemplary embodiment of the present invention is a computer program including instructions for causing an information processing device that includes a data storing means configured to store storage target data and also store address data so as to be tree-structured, the address data being based on a content and storing position of data to be referred to, and the address data referring to the storage target data or other address data, to realize:

an operation log generating means configured to generate an operation log that represents a content of an operation of storing the storage target data into the data storing means and a content of an operation of storing the tree-structured address data referring to the storage target data into the data storing means; and a file system committing means configured to store the storage target data and the tree-structured address data into the data storing means based on the operation log.

Further, a data storing method of another exemplary embodiment of the present invention includes, in an information processing device that includes a data storing means configured to store storage target data and also store address data so as to be tree-structured, the address data being based on a content and storing position of data to be referred to, and the address data referring to the storage target data or other address data:

generating an operation log that represents a content of an operation of storing the storage target data into the data storing means and a content of an operation of storing the tree-structured address data referring to the storage target data into the data storing means; and storing the storage target data and the tree-structured address data into the data storing means based on the operation log.

With the configurations as described above, the present invention can reduce a storage capacity and shorten a storage processing time, and can provide a high-performance storage system.

EXEMPLARY EMBODIMENTS

First Exemplary Embodiment

Figure 2:
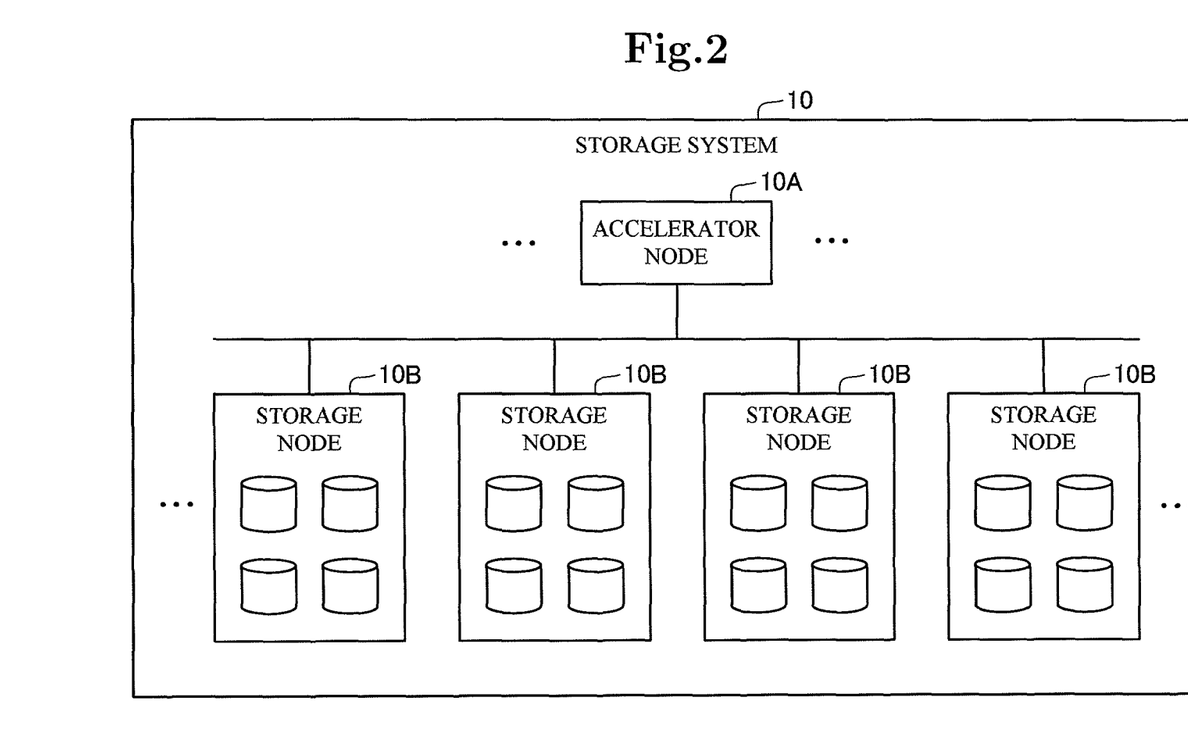
FIG. 2 is a block diagram showing a schematic configuration of a storage system of the present invention.
Figure 3:
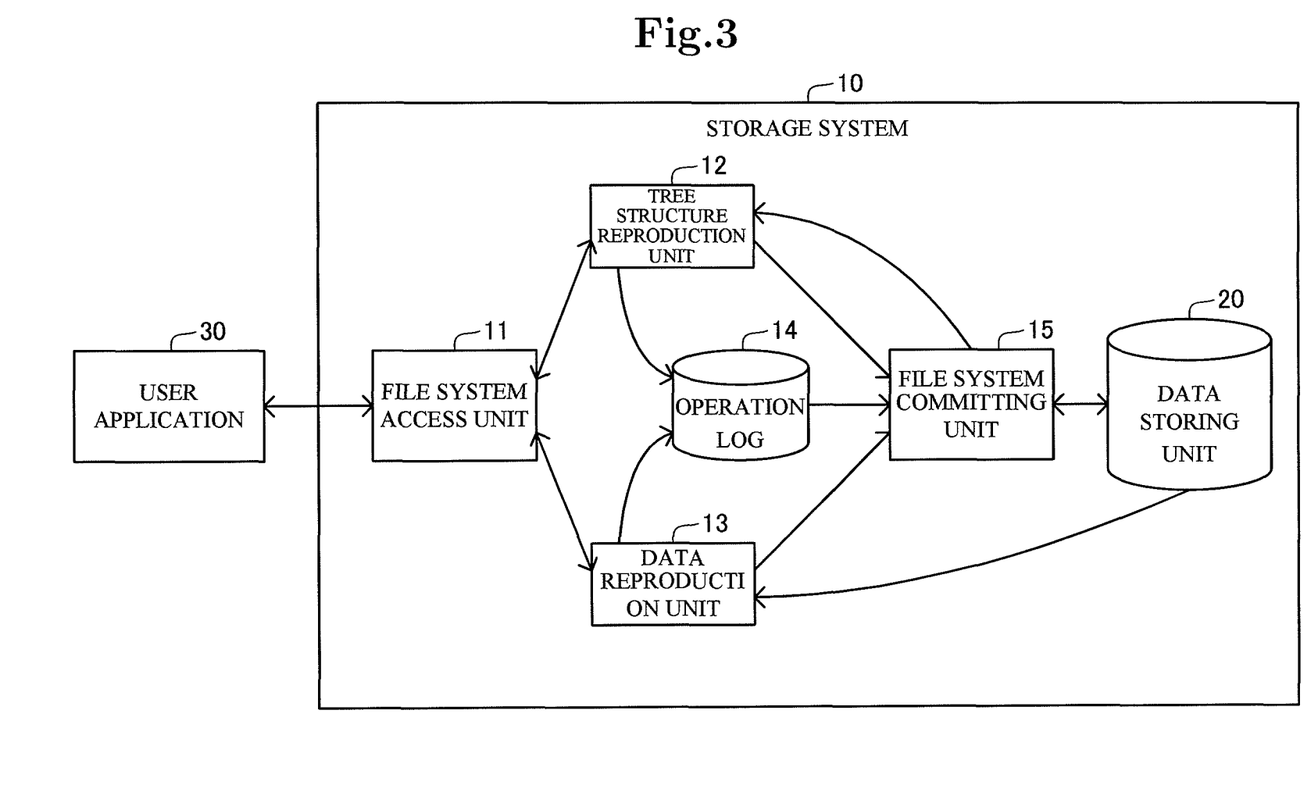
FIG. 3 is a function block diagram showing a configuration of a storage system of a first exemplary embodiment of the present invention.
Figure 4:
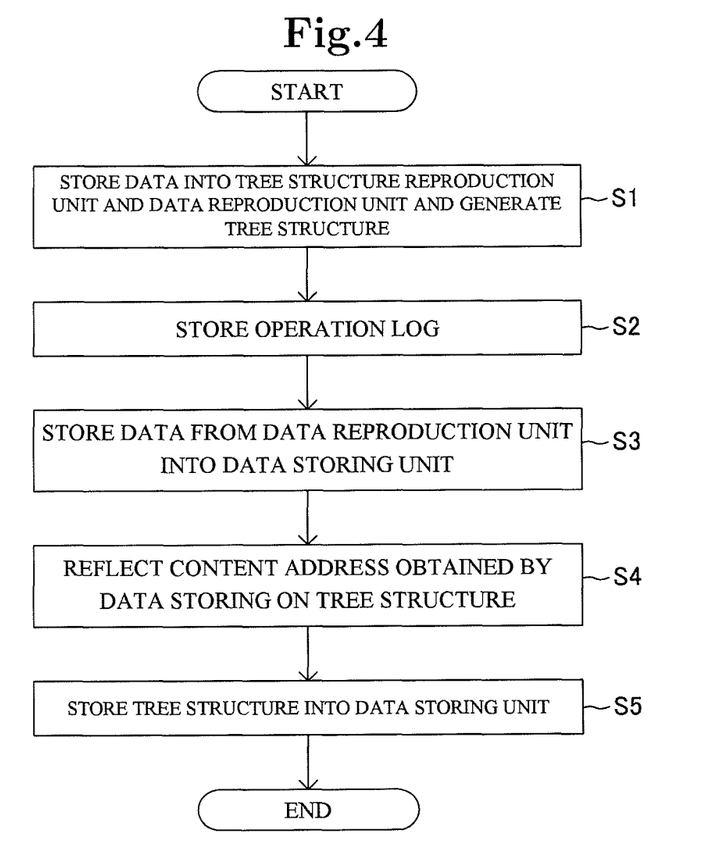
FIG. 4 is a flowchart showing an operation of the storage system disclosed in FIG. 3.

A first exemplary embodiment of the present invention will be described with reference to FIGS. 2 to 8. FIG. 2 is a block diagram schematically showing a storage system. FIG. 3 is a function block diagram showing a configuration of the storage system. FIG. 4 is a flowchart showing an operation of the storage system. FIGS. 5 to 8 are views showing aspects of data storing in the storage system.

This exemplary embodiment shows a specific example of a storage system disclosed in a second exemplary embodiment described later. Below, a case of configuring the storage system by connecting a plurality of server computers will be described. However, the storage system of the present invention is not limited to being configured by a plurality of computers, and may be configured by one computer.

[Configuration]

A storage system 10 of the present invention is connected to a backup system that controls a backup process via a network N that is not shown in the drawings, for example. Then, the backup system acquires backup target data (storage target data) stored in a backup target device connected via the network, and requests the storage system 10 to store. Consequently, the storage system 10 stores the backup target data requested to be stored as a backup. In FIG. 3, as the backup system that requests the storage system 10 to store data, a user application 30 is exemplified.

Further, as shown in FIG. 2, the storage system 10 of this exemplary embodiment is configured by connecting a plurality of server computers. To be specific, the storage system 10 is equipped with an accelerator node 10A serving as a server computer that controls a storing and reproducing operation by the storage system 10, and a storage node 10B serving as a server computer equipped with a storage device that stores data. The number of the accelerator nodes 10A and the number of the storage nodes 10B are not limited to those shown in FIG. 2, and the storage system may be configured by connecting more nodes 10A and more nodes 10B.

Furthermore, the storage system 10 of this exemplary embodiment is a content address storage system that divides data and makes the data redundant to distribute and store into a plurality of storage devices, and that specifies a storing position of the data by a unique content address specified depending on the content of the data.

Below, assuming the storage system 10 is a single system, a configuration and function of the storage system 10 will be described. That is to say, the configuration and function of the storage system 10 described below may be provided in either the accelerator node 10A or the storage node 10B. The storage system 10 is not limited to a configuration including the accelerator node 10A and the storage node 10B necessarily, and may have any configuration.

FIG. 3 shows a configuration of the storage system 10. As shown in this drawing, the storage system 10 is equipped with a file system access unit 11, a tree structure reproduction unit 12, a data reproduction unit 13, an operation log 14, a file system committing unit 15, and a data storing unit 20. Then, the above configuration is realized by installing a program into an arithmetic device of the storage system 10, or realized by forming a data storing region in a storage device. Below, each configuration will be described in detail. The abovementioned program is provided to the storage system 10 in a state stored in a storage medium such as a CD-ROM, for example. Alternatively, the abovementioned program may be stored in a storage device of another server computer on the network and provided to the storage system 10 from the other server computer via the network.

The data storing unit 20 (a data storing means) is a storage region to store data, and has a function of executing a data storing process. To be specific, when given storage target data to store from the file system committing unit 15 and so on, the data storing unit 20 stores the storage target data as described later. At the same time, the data storing unit 20 calculates a hash value based on the data content of the stored storage target data, and returns a content address that is address data referring to the storage target data. Moreover, the data storing unit 20 stores content addresses of a tree structure referring to the storage target data and other content addresses. At this moment, a content address referring to another content address becomes a value that specifies a storing position of the other content address based on the data content of the other content address to be referred to. Thus, a content address is address data based on the content and storing position of data to be referred to, a content address of a higher hierarchy refers to a content address of a lower hierarchy, and finally, content addresses are formed in a tree structure so as to refer to the stored storage target data. An example of a data storing state in the data storing unit 20 will be described later.

Further, the file system access unit 11 provides a means configured to access the user application 30 executing a data storage request, and so on. For example, it is assumed that the file system access unit 11 of this exemplary embodiment is compatible with what are equivalent to system calls used by UNIX™ that is a kind of operation system such as "open," "read," "write" and "close." However, the access means provided by the file system access unit 11 is not limited to the system call described above and may be any interface. Moreover, the user application 30 may use a network file system interface such as NFS (Network File System) and CIFS (Common Internet File System), or may be a local file system within the same machine. Anyway, a request from the user application table 30 can be classified into two types: an operation relating to a tree structure such as "open," "close," "mkdir" and "unlink": an operation relating to data "data" and "write." The file system access unit 10 distributes an operation relating to the tree structure to the tree structure reproduction unit 12, and distributes an operation relating to data to the data reproduction unit 13.

Further, the tree structure reproduction unit 12 accepts a tree structure operating request from the file system access unit 11, retrieves data necessary for the operation of the tree structure from the data storing unit 20, and temporarily generates and holds a tree structure. Since this generated tree structure needs to be finally stored as a file system in the data storing unit 20, the content of the operation of generating the tree structure into the operation log 14.

Further, the data reproduction unit 13 accepts a data transfer request from the file system access unit 11, and executes "read" and "write." For example, when accepting a request to write data, firstly, the data reproduction unit 13 temporarily holds storage target data relating to the writing request, and thereafter stores the held data into the data storing unit 20. Then, when the data storing unit 20 returns a content address, the data reproduction unit 13 sends the file system access unit 11 a response that writing has been completed. In particular, since it is possible to asynchronously execute writing of data if an action on a fault is taken, completion of the writing is notified to the user application 30 via the file system access unit 11 at a time point that the data is temporarily held, and it is possible to sequentially process following requests for writing. At this moment, as a "flush log," a need for writing the temporarily held storage target data into the data storing unit 20 afterward is stored into the operation log 14. In reading of data, it is basic to designate a content address and retrieved from the data storing unit 20, but a cache effect by retrieval from the held data can also be expected.

Further, into the operation log 14 (a cache memory), records of tree operation and data writing are sequentially recorded. To commit a tree structure, completion of writing of data is necessary, and therefore, information of both the tree structure and the data writing. Then, the operation log 14 may be realized as a shared memory that can be accessed by both the tree structure reproduction unit 12 and the data reproduction unit 13 on a memory, or may be realized as a shared file. Moreover, for securing fault tolerance, the operation log 14 may be realized as transaction for a database.

The operation log 14 is formed in a storage region different from a storage device such as a hard disk in which the data storing unit 20 is formed. For example, the operation log 14 is formed in a flush memory that records and reproduces data at higher speeds.

Thus, the tree structure reproduction unit 12, the data reproduction unit 13 and the operation log 14 function as an operation log generating means configured to generate and temporarily store an operation log that represents operation contents of storage target data and address data at the time of storing into the data storing unit 20. At this moment, particularly, the data reproduction unit 13 functions to temporarily store storage target data to be stored into the data storing unit 20, and the tree structure reproduction unit 12 functions to temporarily store a tree structure of address data referring to the storage target data.

Further, the file system committing unit 15 (a file system committing means) sequentially reads a "commit log" and a "flush log" stored in the operation log 14, and stores the tree structure and storage target data that have been temporarily updated by the tree structure reproduction unit 12 and the data reproduction unit 13, into the data storing unit 20. Although FIG. 3 illustrates that all data enter the data storing unit 20 via the file system committing unit 15, the file system committing unit 15 may be configured to prompt the tree structure reproduction unit 12 and the data reproduction unit 13 to store data into the data storing unit 20 and execute actual transfer of the data not via the file system committing unit 15.

For example, a request indicating the last of a file operation such as "close" can cause the tree structure reproduction unit 12 to send a request to commit the file system to the file system committing unit 15. The file system committing unit 15 commits the tree operation and data transfer in correct order in the data storing unit 20 based on the data stored in the operation log 14, whereby committing a file system from which an intermediate state is eliminated becomes possible. Committing a file system can also be executed at predetermined time intervals (e.g., every two minutes) regardless of a time of a request such as "close" mentioned above. In this case, an intermediate state is not completely eliminated, but it is possible to limit recording of a change of the tree structure occurring between the intervals.

[Operation]

Next, an operation of the storage system 10 described above will be described with reference to FIGS. 4 to 8. Firstly, FIG. 5 illustrates data stored in the data storing unit 20, data cached by the tree structure reproduction unit 12 and data cached by the data reproduction unit 13 from creation of a file to writing of storage target data.

Figure 5:
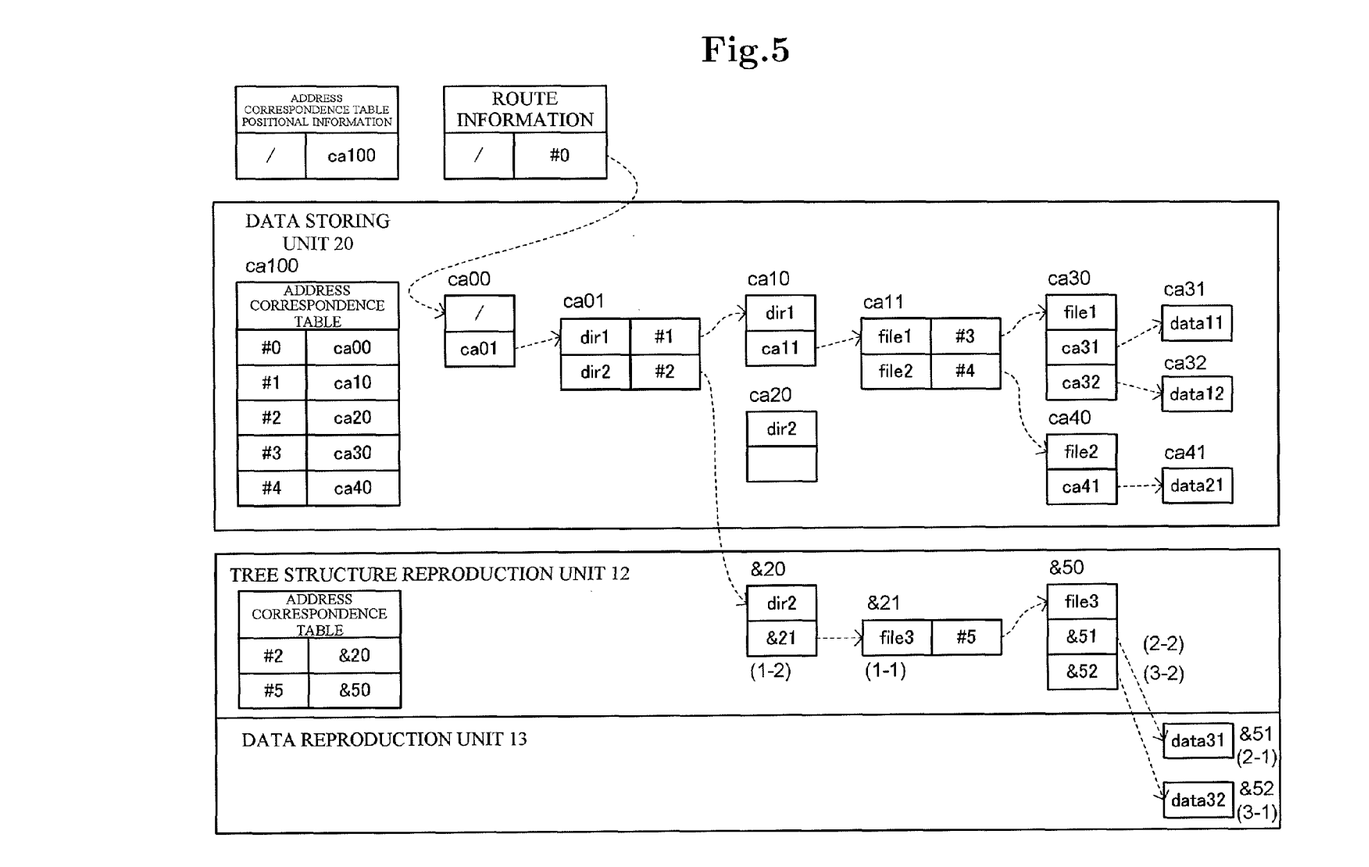
FIG. 5 is a view showing an aspect of data storing in the storage system disclosed in FIG. 3.

As shown in the data storing unit 20 of FIG. 5, in the initial state, a root directory "/" has directories "/dir1" and "/dir2" thereunder, and the directory "/dir1" has "/dir1/file1" and "/dir1/file2" thereunder. Hereinafter, an operation of creating "/dir2/file3" will be shown.

Firstly, when a request to "open" "/dir2/file3" is made by the user application 30, the request is passed to the tree structure reproduction unit 12. Preparatory to accessing the tree structure, the tree structure reproduction unit 12 makes the directory "/dir2" referable in a cache region "&20" and reflects it on an address correspondence table on the tree structure reproduction unit 12. Then, the tree structure reproduction unit 12 assigns a region "&21" and a region "&50" that store information about "file3" therefor (1-1), stores an address "&21" into the cache region "&20" so that it is possible to access them by "#5," and updates the information about the file (1-2). At this moment, since an uncommitted tree structure is left in "&20," "&21" and "&50," the operation log 14 is recorded for executing "commit" afterward to commit the tree structure. To be specific, the operation log 14 including "commit &21" (commit &20) and "commit &22 at close &50" (commit &20 when &50 is close) is recorded.

Subsequently, when writing of data is executed, the data reproduction unit 13 stores storage target data "data31" into a temporary region "&51" (2-1). Then, the data reproduction unit 13 notifies a storing address "&51" to the tree structure reproduction unit 12, whereby the address "&51" is stored into a first region of the region "&50" (2-2). In a like manner, the data reproduction unit 13 stores storage target data "data32" into a temporary region "&52" (3-1), notifies a storing address "&52" to the tree structure reproduction unit 12, and stores the address "&52" into the region "&50" (3-2). Since uncommitted data are left in the regions "&51" and "&52," the operation log 14 for executing "flush" afterward to commit the storage target data is recorded. To be specific, the operation log 14 including "flush &51 at close &50" (write &51 when &50 is close) and "flush &52 at close &50" (write &52 when &50 is close) is recorded. At this moment, it is recorded in the operation log 14 that "&51," "&52" and "&50" are associated. This is used for searching what to "commit" in advance when the "commit" process is executed before "flush" is completed.

Thus, the storage target data is stored into the data reproduction unit 13, and the tree structure of address data referring to the storage target data is generated and stored into the tree structure reproduction unit 12 (step S1 of FIG. 4), and an operation log at that time is recorded (step S2 of FIG. 4).

From the viewpoint of elimination of an intermediate state, it is preferred to hold the tree structure in the tree structure reproduction unit 12 as long as possible, and wait committing of the structure. On the other hand, it is possible to start storing data as a data block at a time point that the size thereof exceeds a size storable in the data storing unit 20.

Figure 6:
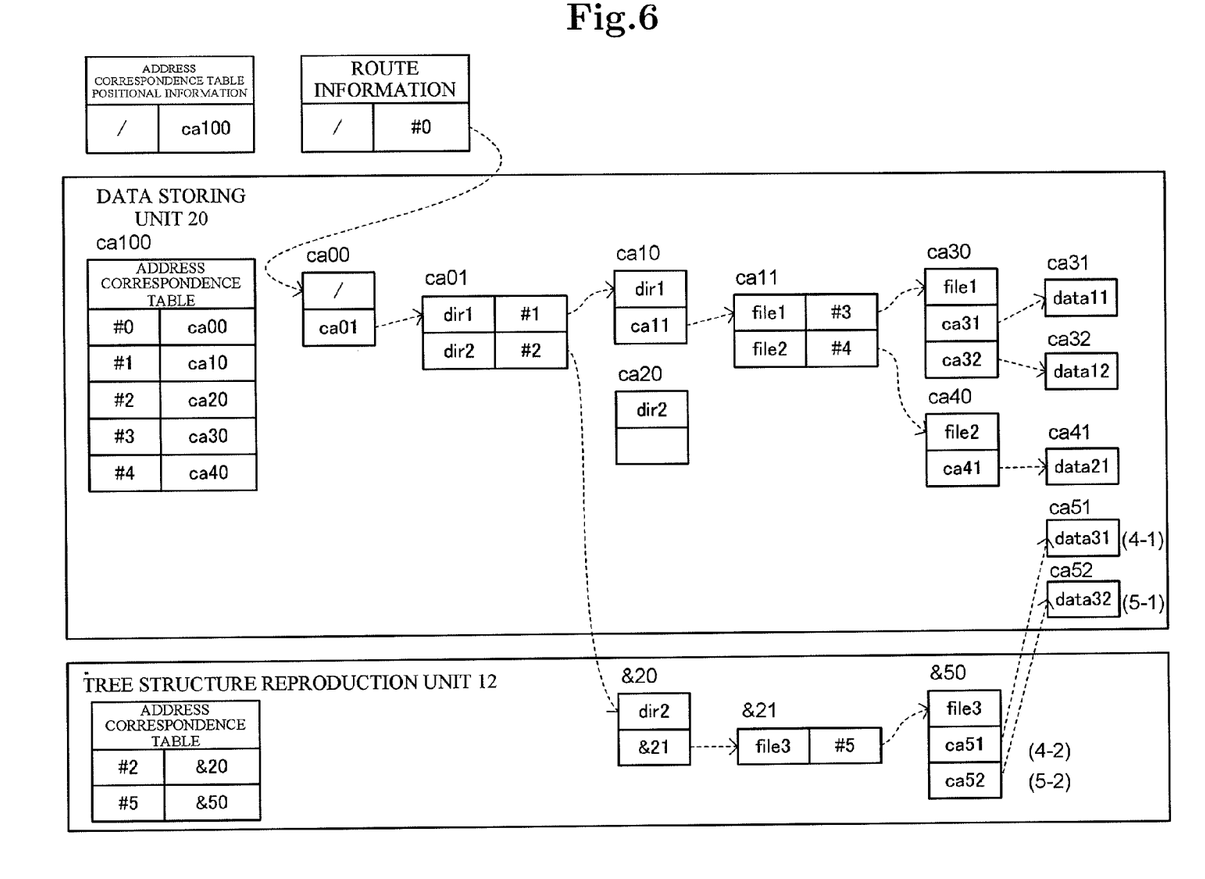
FIG. 6 is a view showing an aspect of data storing in the storage system disclosed in FIG. 3.

Next, FIG. 6 illustrates an operation of committing data. When executing "close" of "File3," the data reproduction unit 13 executes "flush &51" and "flush &52" recorded in the operation log 14. To be specific, the data reproduction unit 13 stores the data "data31" held therein into the data storing unit 20 (step S3 of FIG. 4), and obtains a content address "ca51" of the stored storage target data (4-1). Upon obtaining the content address, the data reproduction unit 13 reflects it on the tree structure of the tree structure reproduction unit 12 (step S4 of FIG. 4) (4-2). In other words, the data reproduction unit 13 stores an address "ca51" into the region "&50" within the tree structure reproduction unit 12. In a like manner, the data reproduction unit 13 stores the held data "data32" into the data storing unit 20 as needed, and obtains a content address "ca52" of the stored storage target data (5-1). Upon obtaining the content address, the data reproduction unit 13 reflects it on the tree structure of the tree structure reproduction unit 12 (5-2). To be specific, the data reproduction unit 13 stores the address "ca52" into the region "&50" within the tree structure reproduction unit 12.

Figure 7:
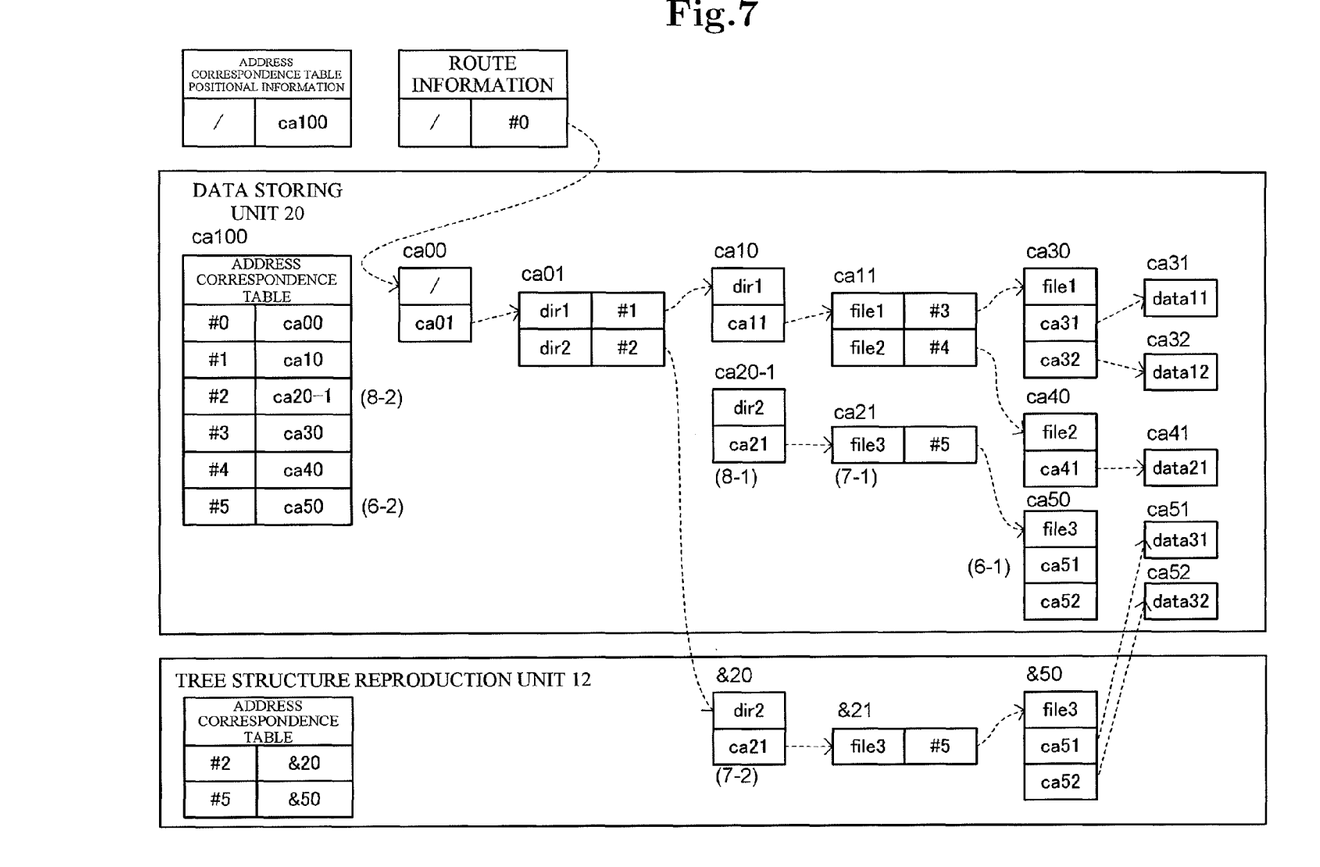
FIG. 7 is a view showing an aspect of data storing in the storage system disclosed in FIG. 3.

FIG. 7 shows an operation when writing of the file is completed and the tree structure is committed. When "close" of "File3" is executed, as described above, the data of "&50" are committed and the content addresses "ca51" and "ca52" are stored into the data storing unit 20 (6-1). Then, the file system committing unit 15 reflects "#5=ca50" on the address correspondence table of the data storing unit 20 (6-2).

Then, based on the operation log 14, the "commit" process left afterward is executed. In other words, "commit &21" is executed, "&21" as data including the indirect address "#5" referring to "ca50" committed as described above is recorded into the data storing unit 20, and a content address "ca21" is committed (7-1). Therefore, into the region "&20" of the tree structure reproduction unit 12, the content address "ca21" is stored (7-2). Moreover, "commit &20" is executed, "&20" within the tree structure reproduction unit 12 is stored into the data storing unit 20, and a content address "ca20-1" is committed (8-1). In response to this, "#2=ca20-1" is reflected on the address correspondence table of the data storing unit 20 (8-2).

Figure 8:
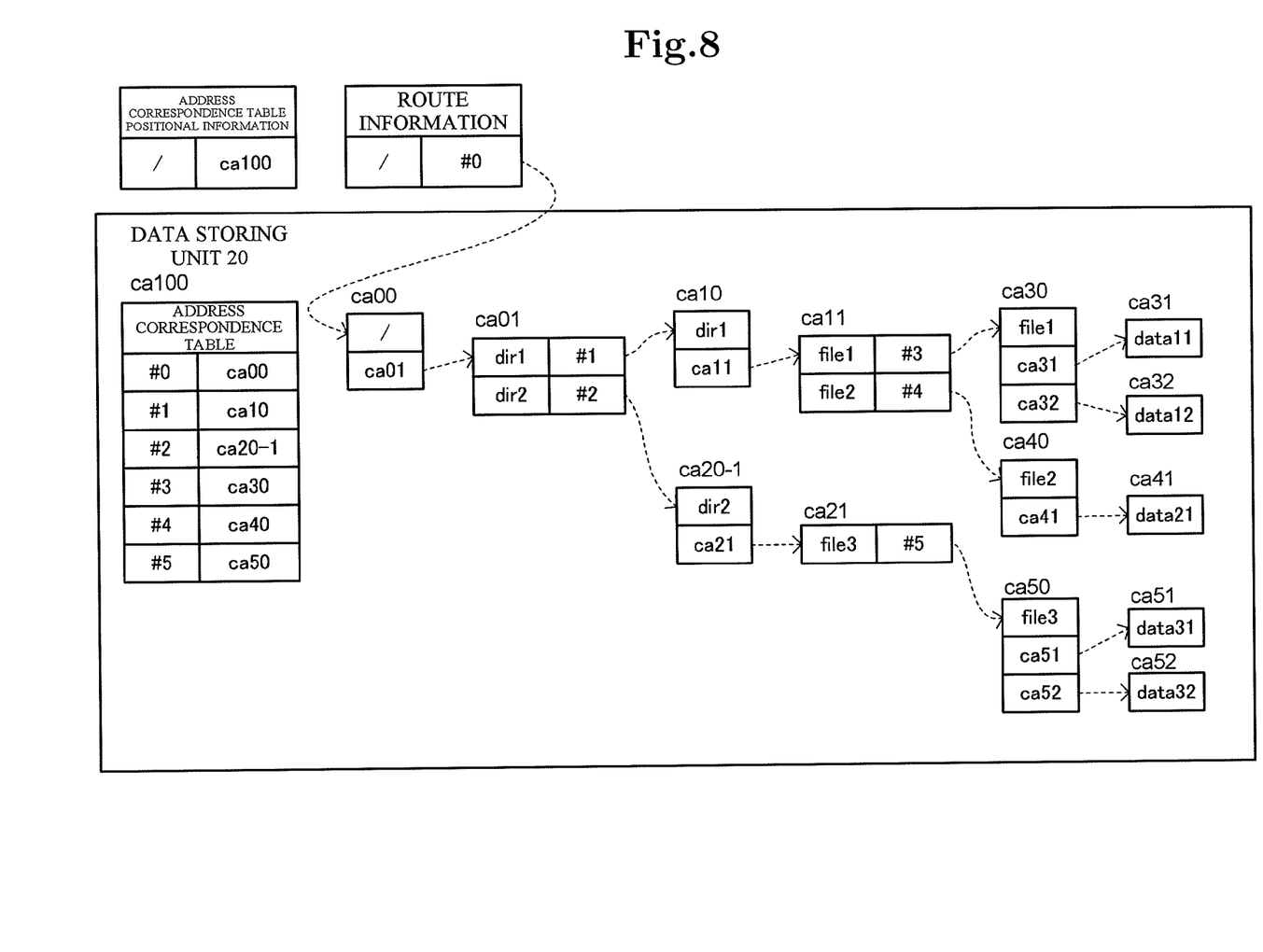
FIG. 8 is a view showing an aspect of data storing in the storage system disclosed in FIG. 3.

Thus, as shown in FIG. 8, the storage target data is stored, and the tree structure of the content addresses referring to the data is stored (step S5 of FIG. 4). Therefore, an unnecessary intermediate state regarding a change of the tree structure in storing of the tree-structured file system is not stored into the data storing unit 20. As a result, it is possible to reduce a storage capacity and shorten a storage processing time and provide a high-performance storage system.

Herein, specifically, after a plurality of storage target data (data31, data32) composing the same file "File3" are stored into the data storing unit 20, by using content addresses specified thereby, a tree structure is committed in order from a lower hierarchy to a higher hierarchy as described above. Therefore, it is possible to limit a change of the tree structure of address data on the data storing unit 20, and it is possible to limit the number of times of storing of the address data. As a result, it is possible to more effectively limit storing of data representing an intermediate state of the content addresses according to the change of the tree structure. At this moment, by storing all of the storage target data composing the same file and then storing the tree structure into the data storing unit 20, it is possible to realize storing of the tree structure of the address data with more efficiency. However, it is also possible to, after storing part of the storage target data composing the same file, store the tree structure of the address data referring to the storage target data.

Since a tree structure of content addresses and storage target data are temporarily held in the tree structure reproduction unit 12 and the data reproduction unit 13 in the above example, it is possible to reuse such data, and it is possible to increase cache efficiency. Accordingly, it is also possible to further increase a storage and reproduction process.

Second Exemplary Embodiment

Figure 9:
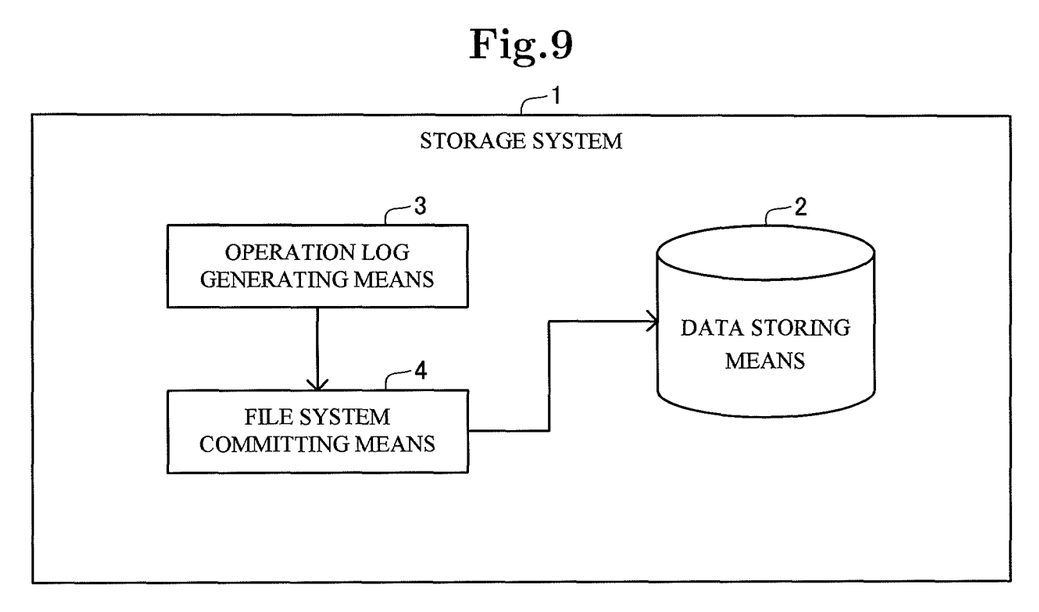
FIG. 9 is a function block diagram showing a configuration of a storage system of a second exemplary embodiment of the present invention.

Next, a second exemplary embodiment of the present invention will be described with reference to FIG. 9. FIG. 9 is a function block diagram showing a configuration of a storage system of this exemplary embodiment. In this exemplary embodiment, the aforementioned storage system will be schematically described.

As shown in FIG. 9, a storage system 1 of this exemplary embodiment includes:

a data storing means 2 configured to store storage target data and also store address data so as to be tree-structured, the address data being based on a content and storing position of data to be referred to, and the address data referring to the storage target data or other address data;

an operation log generating means 3 configured to generate an operation log that represents a content of an operation of storing the storage target data into the data storing means and a content of an operation of storing the tree-structured address data referring to the storage target data into the data storing means; and a file system committing means 4 configured to store the storage target data and the tree-structured address data into the data storing means based on the operation log.

Then, in the storage system, the operation log generating means is configured to execute an operation of storing the storage target data and the tree-structured address data into a cache memory that is a storage region different from the data storing means, and also generate the operation log based on the storing operation and store the operation log into the cache memory.

Further, in the storage system, the file system committing means is configured to store the storage target data into the data storing means based on the operation log, and also store the tree-structured address data using the address data specified by storing the storage target data into the data storing means, into the data storing means based on the operation log.

Further, in the storage system, the file system committing means is configured to store the address data into the data storing means in order from a lower hierarchy to a higher hierarchy of the tree-structured address data based on the operation log.

According to the present invention, firstly, when storing storage target data and tree-structured address data referring to the storage target data into the data storing means, the storage system generates an operation log representing a content of an operation of storing each of the data. To be specific, the storage system executes a process of storing storage target data and tree-structured address data referring thereto into the cache memory, generates an operation log based on the storing process, and stores into the cache memory. At this point of time, either the storage target data or the tree-structured address data are not stored in the data storing means yet. After that, based on the operation log, the storage system stores the storage target data and the tree-structured address data into the data storing means. To be specific, the storage system firstly stores the storage target data into the data storing means, and thereafter, stores the address data specified thereby into the data storing means in order from a lower hierarchy to a higher hierarchy of the tree structure.

Consequently, it is possible to reduce the number of times of writing of the tree-structured address data, and it is possible to limit a change of the tree structure. Therefore, it is possible to limit storing of data representing an intermediate state according to a change of the tree structure into the data storing means. As a result, it is possible to reduce a storage capacity and shorten a storage processing time, and it is possible to provide a high-performance storage system.

Further, in the storage system, the file system committing means is configured to store a plurality of storage target data into the data storing means and thereafter store the address data into the data storing means based on the operation log.

Further, in the storage system, the file system committing means is configured to store the plurality of storage target data composing a same file into the data storing means.

Further, in the storage system, the file system committing means is configured to store all of the plurality of storage target data composing the same file and the tree-structured address data referring to the plurality of storage target data into the cache memory, and thereafter, store the plurality of storage target data and the tree-structured address data into the data storing means.

Thus, by writing a plurality of storage target data into the data storing means and thereafter storing address data specified thereby, it is possible to limit a change of the tree structure of address data on the data storing means, and it is possible to limit the number of times of storing of the address data. As a result, it is possible to more efficiently reduce a storage capacity and shorten a storage processing time.

Further, the abovementioned storage system can be realized by installing a computer program into an information processing device. To be specific, a computer program of another exemplary embodiment of the present invention includes instructions for causing an information processing device that includes a data storing means configured to store storage target data and also store address data so as to be tree-structured, the address data being based on a content and storing position of data to be referred to, and the address data referring to the storage target data or other address data, to realize:

an operation log generating means configured to generate an operation log that represents a content of an operation of storing the storage target data into the data storing means and a content of an operation of storing the tree-structured address data referring to the storage target data into the data storing means; and a file system committing means configured to store the storage target data and the tree-structured address data into the data storing means based on the operation log.

Then, in the computer program, the operation log generating means is configured to execute an operation of storing the storage target data and the tree-structured address data into a cache memory that is a storage region different from the data storing means, and also generate the operation log based on the storing operation and store the operation log into the cache memory.

Further, a data storing method of another exemplary embodiment of the present invention, executed by operation of the abovementioned storage system includes, in an information processing device that includes a data storing means configured to store storage target data and also store address data so as to be tree-structured, the address data being based on a content and storing position of data to be referred to, and the address data referring to the storage target data or other address data:

generating an operation log that represents a content of an operation of storing the storage target data into the data storing means and a content of an operation of storing the tree-structured address data referring to the storage target data into the data storing means; and storing the storage target data and the tree-structured address data into the data storing means based on the operation log.

Then, the data storing method includes, at the time of generating the operation log, executing an operation of storing the storage target data and the tree-structured address data into a cache memory that is a storage region different from the data storing means, and also generating the operation log based on the storing operation and storing the operation log into the cache memory.

Inventions of a computer program and a data storing method having the abovementioned configurations have like actions as the abovementioned storage system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-045232, filed on Feb. 27, 2009, the disclosure of which is incorporated herein in its entirety by reference.

INDUSTRIAL APPLICABILITY

The present invention can be utilized for a storage system of a content address type configured to, by a unique address specified depending on the content of stored data, specify a storing position in which the data is stored, and has industrial applicability.

DESCRIPTION OF REFERENCE NUMERALS 1 storage system
2 data storing means
3 operation log generating means
4 file system committing means
10 storage system
10A accelerator node
10B storage node
11 file system access unit
12 tree structure reproduction unit
13 data reproduction unit
14 operation log
15 file system committing unit
20 data storing unit

The invention claimed is:

1. A storage system comprising:
a data storing unit configured to store storage target data and also store address data so as to be tree-structured, the address data being based on a content and storing position of data to be referred to, and the address data referring to the storage target data or other address data;
an operation log generating unit configured to generate an operation log that represents a content of an operation of storing the storage target data into the data storing unit and a content of an operation of storing the tree-structured address data referring to the storage target data into the data storing unit; and
a file system committing unit configured to store the storage target data and the tree-structured address data into the data storing unit based on the operation log.

2. The storage system according to claim 1, wherein the operation log generating unit is configured to execute an operation of storing the storage target data and the tree-structured address data into a cache memory that is a storage region different from the data storing unit, and also generate the operation log based on the storing operation and store the operation log into the cache memory.

3. The storage system according to claim 2, wherein the file system committing unit is configured to store the storage target data into the data storing unit based on the operation log, and also store the tree-structured address data using the address data specified by storing the storage target data into the data storing unit, into the data storing unit based on the operation log.

4. The storage system according to claim 3, wherein the file system committing unit is configured to store the address data into the data storing unit in order from a lower hierarchy to a higher hierarchy of the tree-structured address data based on the operation log.

5. The storage system according to claim 3, wherein the file system committing unit is configured to store a plurality of storage target data into the data storing unit and thereafter store the address data into the data storing unit based on the operation log.

6. The storage system according to claim 5, wherein the file system committing unit is configured to store the plurality of storage target data composing a same file into the data storing unit.

7. The storage system according to claim 6, wherein the file system committing unit is configured to store all of the plurality of storage target data composing the same file and the tree-structured address data referring to the plurality of storage target data into the cache memory, and thereafter, store the plurality of storage target data and the tree-structured address data into the data storing unit.

8. A non-transitory computer-readable storage medium that stores a program comprising instructions for causing an information processing device that includes a data storing unit configured to store storage target data and also store address data so as to be tree-structured, the address data being based on a content and storing position of data to be referred to, and the address data referring to the storage target data or other address data, to realize:
an operation log generating unit configured to generate an operation log that represents a content of an operation of storing the storage target data into the data storing unit and a content of an operation of storing the tree-structured address data referring to the storage target data into the data storing unit; and a file system committing unit configured to store the storage target data and the tree-structured address data into the data storing unit based on the operation log.

9. The non-transitory computer-readable storage medium that stores the program according to claim 8, wherein the operation log generating unit is configured to execute an operation of storing the storage target data and the tree-structured address data into a cache memory that is a storage region different from the data storing unit, and also generate the operation log based on the storing operation and store the operation log into the cache memory.

10. A data storing method comprising, in an information processing device that includes a data storing unit configured to store storage target data and also store address data so as to be tree-structured, the address data being based on a content and storing position of data to be referred to, and the address data referring to the storage target data or other address data:
   generating an operation log that represents a content of an operation of storing the storage target data into the data storing unit and a content of an operation of storing the tree-structured address data referring to the storage target data into the data storing unit; and
   storing the storage target data and the tree-structured address data into the data storing unit based on the operation log.

11. The data storing method according to claim 10 comprising, at the time of generating the operation log, executing an operation of storing the storage target data and the tree-structured address data into a cache memory that is a storage region different from the data storing unit, and also generating the operation log based on the storing operation and storing the operation log into the cache memory.

* * * * *